US006208939B1

United States Patent
Kunii

(10) Patent No.: US 6,208,939 B1
(45) Date of Patent: Mar. 27, 2001

(54) TOPOGRAPHY INFORMATION DATA PROCESSING METHOD AND APPARATUS BASED ON MANIFOLD CORRESPONDING THERETO

(75) Inventor: Tosiyasu Laurence Kunii, Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 0 days.

(21) Appl. No.: 09/351,640

(22) Filed: Jul. 13, 1999

(51) Int. Cl.$^7$ ........................................... G06F 19/00
(52) U.S. Cl. ................................. 702/5; 703/2; 702/16
(58) Field of Search ........................ 702/2, 5, 11, 12, 702/13, 14, 16; 703/10, 2; 367/59, 73

(56) References Cited

U.S. PATENT DOCUMENTS 5,103,429 * 4/1992 Gelchinsky ............................. 367/38
5,465,323 * 11/1995 Mallet ..................................... 702/2
6,106,561 * 8/2000 Farmer ................................... 703/10

* cited by examiner

Primary Examiner—Donald E. McElheny, Jr.
(74) Attorney, Agent, or Firm—Morrison & Foerster, LLP

(57) ABSTRACT

A topography information data processing system acquires ground surface data which represents bumps and hollows on the ground, generates manifold data which represents the shape of the manifold that encloses the bumps and hollows on the ground based on the ground surface data, and acquires topological geometric data applying the Morse theory to the manifold data. A new type of geographic information data representation is provided by using topological geometric data generated based on the Morse theory known in differential geometry and differential topology. Geographic information data suitable to be stored in a recording medium or to be transmitted through a network is provided.

21 Claims, 13 Drawing Sheets

| | | (COORDINATE VALUES)/TIPE |
|---|---|---|
| NODE | N1 | (X1,Y1,Z1)/2 |
| | N2 | (X2,Y2,Z2)/2 |
| | N3 | (X3,Y3,Z3)/1 |
| | N4 | (X4,Y4,Z4)/1 |
| | N5 | (X5,Y5,Z5)/0 |
| | N6 | (X6,Y6,Z6)/0 |

| EDGE | | (CONNECTED NODES) / EQUATION |
|---|---|---|
| | E1 | (N1, N3) / Eeq1 |
| | E2 | (N2, N3) / Eeq2 |
| | E3 | (N3, N4) / Eeq3 |
| | E4 | (N4, N5) / Eeq4 |
| | E5 | (N4, N6) / Eeq5 |

FIG. 4

| CONTOUR | | EDGE / EQUATION / Z VALUE |
|---|---|---|
| | C1 | E1 / Ceq1 / h1 |
| | C2 | E1 / Ceq2 / h2 |
| | C3 | E1 / Ceq3 / h3 |
| | C4 | N2 / Ceq4 |
| | ⋮ | ⋮ |
| | C8 | E5 / Ceq8 / h8 |
| | C9 | N6 / Ceq9 |

FIG. 5

TOPOGRAPHY INFORMATION DATA PROCESSING METHOD AND APPARATUS BASED ON MANIFOLD CORRESPONDING THERETO

BACKGROUND OF THE INVENTION

1. Field of the Invention

The present invention relates to a topography information data processing method for processing ground surface data which represents bumps and hollows on the ground surface and discrete geographic data that includes height information which indicates bumps and hollows on the ground and the like.

2. Description of Related Art

In recent years, as the computer becomes more sophisticated, the topography of the land and ocean floor is actively being transformed into database as exemplified by the concept of GIS (geographic information system). To obtain such database, the topography is expressed based on 3-dimensional geographic information data such as longitude, latitude, and height.

Geographic information data is obtained using sensor devices such as a satellite and an ultrasonic distance measuring equipment. These sensor devices measure the height or depth of each of observation points located on the ground in the form of grid points. Polygonal data and mesh data are acquired based on the 3-diemnsional geographic data obtained by measurement, that is, discrete geographic data. A surface which contains bumps and hollows on the ground is represented in a 3-dimensional space by carrying out rendering based on the polygonal data.

The amount of discrete geographic data obtained by the sensor devices is enormous. If the discrete geographic data is transformed into polygonal data, the amount of data increases even more. Therefore, it is difficult just to store the obtained enormous discrete geographic data and polygonal data. Currently, most of the discrete geographic data obtained by the satellites are discarded without being stored effectively.

SUMMARY OF THE INVENTION

It is an object of the present invention to provide a topography information data processing method and apparatus capable of utilizing currently available geographic information data to provide novel topography information data representation.

This data processing method acquires ground surface data which represents bumps and hollows on the ground, generates manifold data which represents the shape of a manifold that encloses the bumps and hollows on the ground based on the ground surface data, and acquires topological geometric data applying the Morse theory to the manifold data.

According to one aspect of this method, novel shape representation is provided by using topological geometric data generated based on the Morse theory known in differential geometry and differential topology. The data amount of such topological geometric data is generally smaller than the data amount of polygonal data.

A manifold may be defined to be a surface in the 3-dimensional Euclidean space. A point on a smooth manifold may be called a critical point if the plane tangent to the manifold at the point is, for example, substantially parallel to a horizontal plane. The index of a critical point of a smooth manifold is defined to be 0 if the surface forms a pit or a bowl-shaped surface in the neighborhood of the critical point. The index of a critical point a smooth manifold is defined to be 1 if the surface forms a saddle in the neighborhood of the critical point. The index of a critical point a smooth manifold is defined to be 2 if the surface forms a peak or a cap-shaped surface in the neighborhood of the critical point.

According to the Morse theory, critical points of a smooth manifold and the indices of the critical points can be determined by prescribing an appropriate Morse function. Using these information, a space having the same homotopy type as the manifold can be reproduced. Here, two geometric objects in the 3-dimensional Euclidean space are said to be of the same homotopy type if the two geometric objects can be continuously deformed onto each other. For example, a sphere is of the same homotopy type as a tetrahedron but not of the same homotopy type as a torus.

In order to describe the shape of the manifold, it suffices to add geometric information to the space. Such geometric information can be specified by a structure graph for representing the structure of the manifold, for example, a Reeb graph known in differential topology and differential geometry. A Reeb graph of a manifold shows a skeleton of the manifold obtained by converging each of an arbitrary number of connected components of the manifold that appear on the cross sections of the manifold to a single point. Once the Morse function is determined, the critical points and the indices of the critical points are uniquely determined. Hence, the manifold may be automatically and uniquely converted to topological geometric data.

In acquiring ground surface data, boundary lines may be drawn on the ground to partition the ground into multiple regions. A region may be then cut out along the boundary line that encloses the region. The surface of the entire Earth can be regarded as a manifold. Moreover, a manifold may be formed for any region on the Earth. By partitioning a given area on the ground region into multiple regions, the topological geometric data of the given area is distributed among the regions.

In the case a manifold is formed for each region, in generating manifold data, an arbitrary virtual surface may be attached to the uneven surface of the region enclosed by the boundary line to form a closed manifold. In other words, a closed surface that encloses the ground surface of the region represented by a single uneven surface can be formed. By forming the closed manifold, the Morse theory may be applied to the closed manifold that encloses the uneven surface of the region.

In another aspect of the present invention, discrete topography data that includes the height information on the ground may be used in place of the above-mentioned ground surface data.

The topography information data processing method of the present invention may be realized not only by hardware but also software.

According to still another aspect of the present invention, a topography information data processing apparatus is provided. This apparatus comprises a data inputting device to acquire ground surface data which represents a shape of an uneven ground surface, a preprocessor to generate manifold data which represents a shape of a manifold that encloses said uneven ground surface based on said ground surface data and a modeling unit to obtain topological geometric data from said manifold data. The data inputting device may input discrete topography data having height or depth of the uneven ground surface.

BRIEF DESCRIPTION OF THE DRAWINGS

FIG. 4 shows the data structure of the edges contained in the topological geometric data.

FIG. 5 shows the data structure of the contour lines contained in the topological geometric data.

DETAILED DESCRIPTION OF THE INVENTION

In what follows, an embodiment of the present invention will be explained with reference to the attached drawings.

Figure 1:
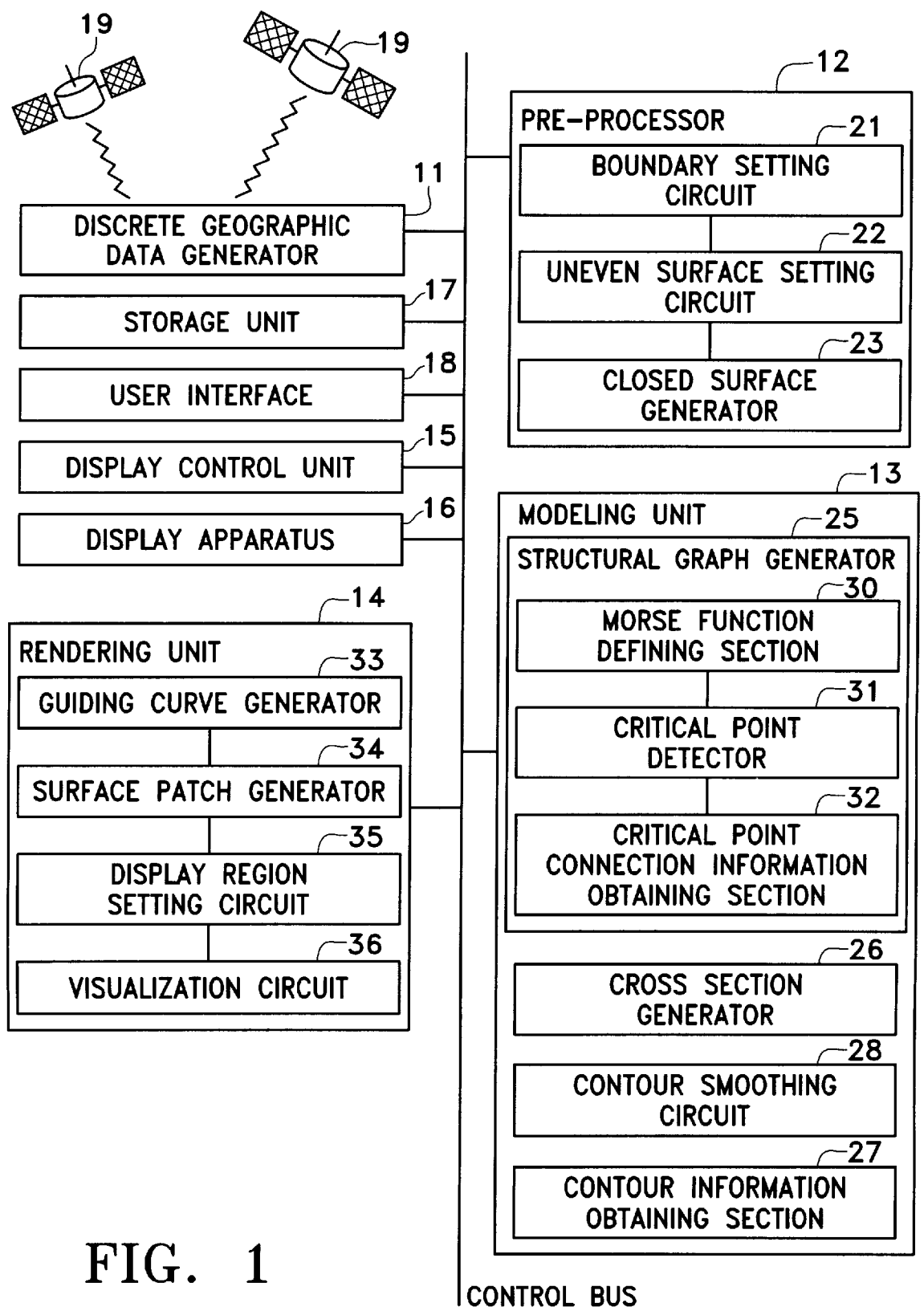
FIG. 1 is a block diagram which schematically shows an exemplary topography information system that uses novel geographic information data according to one aspect of the present invention.

FIG. 1 shows an exemplary geographic information system (GIS) that uses novel geographic information data representation according to the present invention. This geographic information system 10 has a discrete geographic data generator 11 which generates discrete geographic data that includes height information that represents bumps and hollows on the ground. The generated discrete geographic data is sent to a pre-processor 12. The pre-processor 12 generates manifold data for representing the 3-dimensional shape of a manifold that contains the bumps and hollows on the ground based on the discrete geographic data. The generated manifold data is sent to a modeling unit 13. The modeling unit 13 generates topological geometric data in which geometric data is added to topological data applying the Morse Theory, which is known in differential topology and differential geometry, to the manifold data. This topological geometric data corresponds to the novel topography data representation according to the present invention.

The rendering unit 14 generates 2-dimensional display data which displays on a 2-dimensional plane a stereoscopic image of the ground surface based on the generated topological geometric data. The generated 2-dimensional display data is supplied to the display control unit 15. By the function of this display control unit 15, the stereoscopic image of the ground surface represented by the 2-dimensional display data is displayed on the 2-dimensional display screen of the display unit 16. In the case the generated topological geometric data is stored in the storage unit 17, the rendering unit 14 receives the generated topological geometric data from the storage unit 17. Commands and information data needed to operate the discrete geographic data generator 11, pre-processor 12, modeling unit 13, rendering unit 14, display control unit 15, and storage unit 17 are supplied to each unit via the user interface 18 such as a mouse and a keyboard.

To be more specific, the discrete geographic data generator 11 receives measurement data from the satellite 19 that is obtained based on the principle of triangulation and generates discrete geographical data. The discrete geographical data represents the height information of bumps and hollows on the ground surface for each of the observation points set on the ground surface in the form of grids. The position of the observation point may be specified, for example, by the longitude and the latitude or the distance from an arbitrary reference point. The height information is represented by, for example, the altitude or depth of water, or the length of a vertical line that is dropped from the ground to an arbitrary plane. Currently, it is difficult to obtain height information from a satellite. Hence, for example, trigonometric measurement based on aeronautical photographing or an infrared distance measuring apparatus is often used to obtain height data.

The pre-processor 12 has a boundary line setting circuit 21 which clips out the area enclosed by the boundary line drawn on the ground surface and an uneven surface setting circuit 22 which creates ground surface data that represents the bumpy shape of the ground surface based on the discrete topography data obtained within the area enclosed by the boundary line. Using the ground surface data, the ground surface clipped out along its boundary is represented as a piece of bumpy surface. Such ground surface data suffices to be, for example, polygonal data used in computer graphics.

The closed surface generator 23 transforms the bumpy surface within the boundary line represented by the ground surface data into a closed surface. To accomplish this, an arbitrary virtual surface is attached to the bumpy surface to create a closed manifold bounded by the bumpy surface and the virtual surface. The manifold data represents the 3-dimensional shape of this closed manifold. Such a virtual surface can be formed, for example, by newly adding a 3-dimensional coordinate point datum to the ground surface data. Such a 3-dimensional coordinate point datum suffices to specify one 3-dimensional coordinate point separated from the bumpy surface enclosed by the contour line as will be explained later.

The modeling unit 13 has a structure graph generator 25. The structure graph generator 25 generates a structure graph which indicates the skeletal structure of the closed manifold obtained above. A Reeb graph is an example of such a structure graph. The cross section generator 26 generates cross sections of the closed manifold specified by the structure graph. The contour information acquiring circuit 27 acquires the topological geometric information of the contour of each of the cross sections of the closed manifold. This topological geometric information is obtained, for example, by expressing the contours by equations. When the ground surface data is polygonal data, the contour line is a polygonal line. Therefore, a smooth contour that approximates the polygonal line may be generated using the contour smoothing circuit 28.

The structure graph generator 25 has a Morse function prescribing unit 30 which prescribed a Morse function described by the Morse theory. The Morse function suffices to be a function that sets the direction of the height of the closed manifold. The critical point detection unit 31 detects the 3-dimensional coordinate (for example, x, y, and z coordinates) and index (type of critical point) of a critical point (node) in accordance with the prescribed Morse function as will be explained in detail later. The critical point connection information acquiring unit 32 acquires topological geometric information which indicates the connection relation between the detected critical points. This topological geometric information is represents by equations which represent the curve (edge) that connects the critical points with each other.

The rendering unit 14 has a guiding curve generator 33 which generates a guiding curve that specifies the exterior shape of the closed manifold by connecting the contours with each other based on the topological geometric data. The guiding curve suffices to be represented by equations that depict a free form curve. The guiding curve and the contour curves form surface regions that partition the surface of the closed manifold. Surface patches generated by the surface patch generator 34 are placed on the surface regions. The surface shape of the closed manifold that was originally represented by a discrete set of contour curves is now represented as a continuous surface by these surface patches. A conventional method can be used to generate the surface patches.

The display region setting circuit 35 removes the virtual surface from the 3-dimensional shape of the manifold. In removing the virtual surface, it suffices to detect the boundary curve from the generated set of surface patches, as will be explained in detail later. Once the virtual surface is removed, the bumpy surface on the ground enclosed by the boundary curve is extracted. The visualization circuit 36 performs a shading process or hidden surface removal process to the extracted bumpy surface based on the set view point of the observer and the position of the light source. A conventional method can be used for the shading process or hidden surface removal process. The 2-dimensional display data obtained by the shading process or hidden surface removal process is then sent to the display control unit 15.

Figures 2, 3:
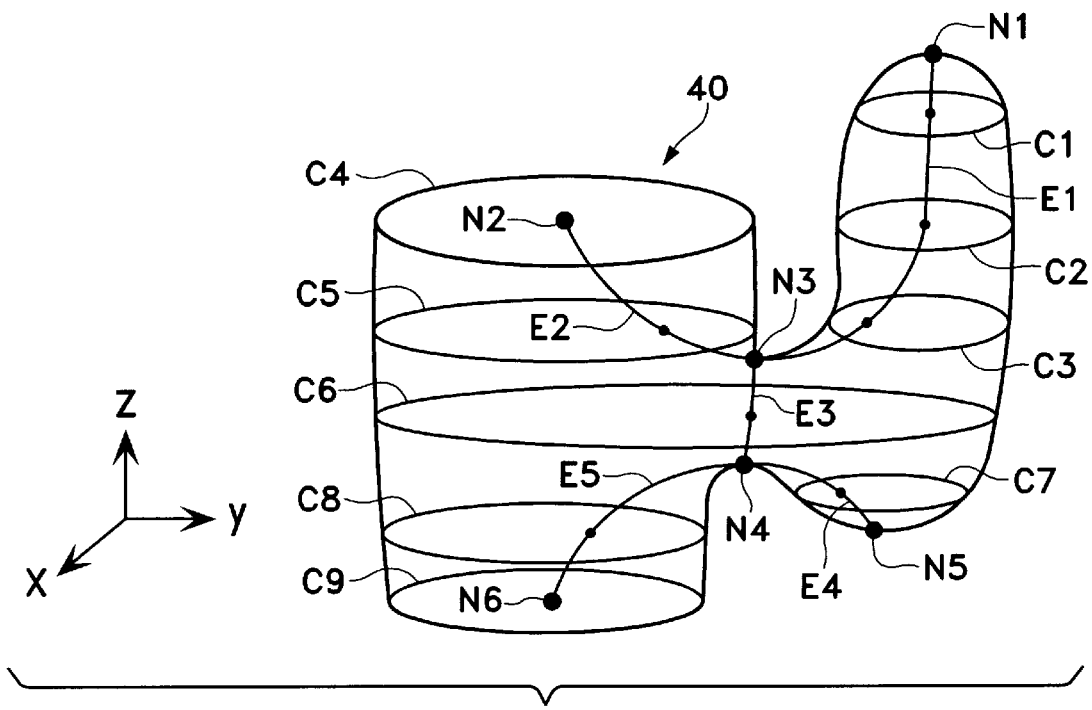
FIG. 2 shows the Reeb graph and contour lines extracted from a 3-dimensional object.
FIG. 3 shows the data structure of the nodes contained in topological geometric data.

Next, the topological geometric data used in the present invention will be explained in detail. As shown in FIG. 2, a 3-dimensional object 40 placed in an arbitrary 3-dimensional coordinate system xyz is now considered. A Morse function that represents the height of the 3-dimensional object 40 in the z-axis direction is set. Six nodes N1 through N6 on the 3-dimensional object 40 are then extracted. At nodes N1 through N3, the tangent planes lie above the xy-plane. At nodes N4 through N6, the tangent planes lie below the xy-plane. By the definition of critical points, the lines passing through nodes N1 through N6 normal to the 3-dimensional object 40 are parallel to the z-axis. In the Reeb graph, nodes N1 and N2 are classified as peaks, nodes N2 and N4 are classified as saddle points, and nodes N5 and N6 are classified as pits. The xyz coordinates and critical point types of the nodes N1 through N6 extracted regularly from the 3-dimensional object 40 constitute topological geometric data based on the data structure as shown in FIG. 3. In this data structure, peaks, saddle points, and pits are specified by the indices "2", "1", and "0", respectively.

In the Morse theory, a critical point cannot be uniquely specified on a portion of a surface if the portion is parallel to the horizontal plane. Such a portion of the surface is called degenerate. For example, the two flat portions of the object 40 containing nodes N2 and N6, respectively, are degenerate portions of the object 40.

However, in such a case, a virtual local patch of neighborhood is introduced to create a peak or pit. In this way, a non-degenerate portion is created on the degenerate portion of the surface. As a result, the critical points N2 and N6 are extracted from the 3-dimensional object 40.

According to the Reeb graph shown in FIG. 2, edges E1 through E5 represent the skeletal structure of the 3-dimensional object 40 which connects all the six nodes. Such edges can be represented by parametric curves such as Besier curves, B-spline curves, NURBS (Non Uniform Rational B-Spline) curves in the 3-dimensional xyz-coordinate system. The equations Eeq1 through Eeq5 of the edges E1 through E5 extracted regularly from the 3-dimensional object 40 constitute the topological geometric data based on the data structure as shown in FIG. 4.

As shown in FIG. 2, the exterior shape of the 3-dimensional object 40 can be captured by contour curves C1 through C9, which are parallel to the xy-plane, containing each point of the Reeb graph including the nodes. These contour curves C1 through C9 can be represented by parametric curves such as Besier curves, B0spline curves, NURBS (Non Uniform Rational B-Spline) curves in the 3-dimensional xyz-coordinate system. The nine planes containing the contour curves C1 through C9, respectively, can be specified by, for example, the z-coordinates of the equations Eeq1 through Eeq5 of the edges E1 through E5, respectively. In this way, the equations Ceq1 through Ceq9 of the contours C1 through C9 extracted regularly from the 3-dimensional object 40 constitute topological geometric data based on the data structure shown in FIG. 5. In this data structure, the planes parallel to the xy-plane on which the contours C4 and C9 lie around nodes N2 and N6 are determined by the z-coordinates of the nodes N2 and N6, respectively.

Figure 6:
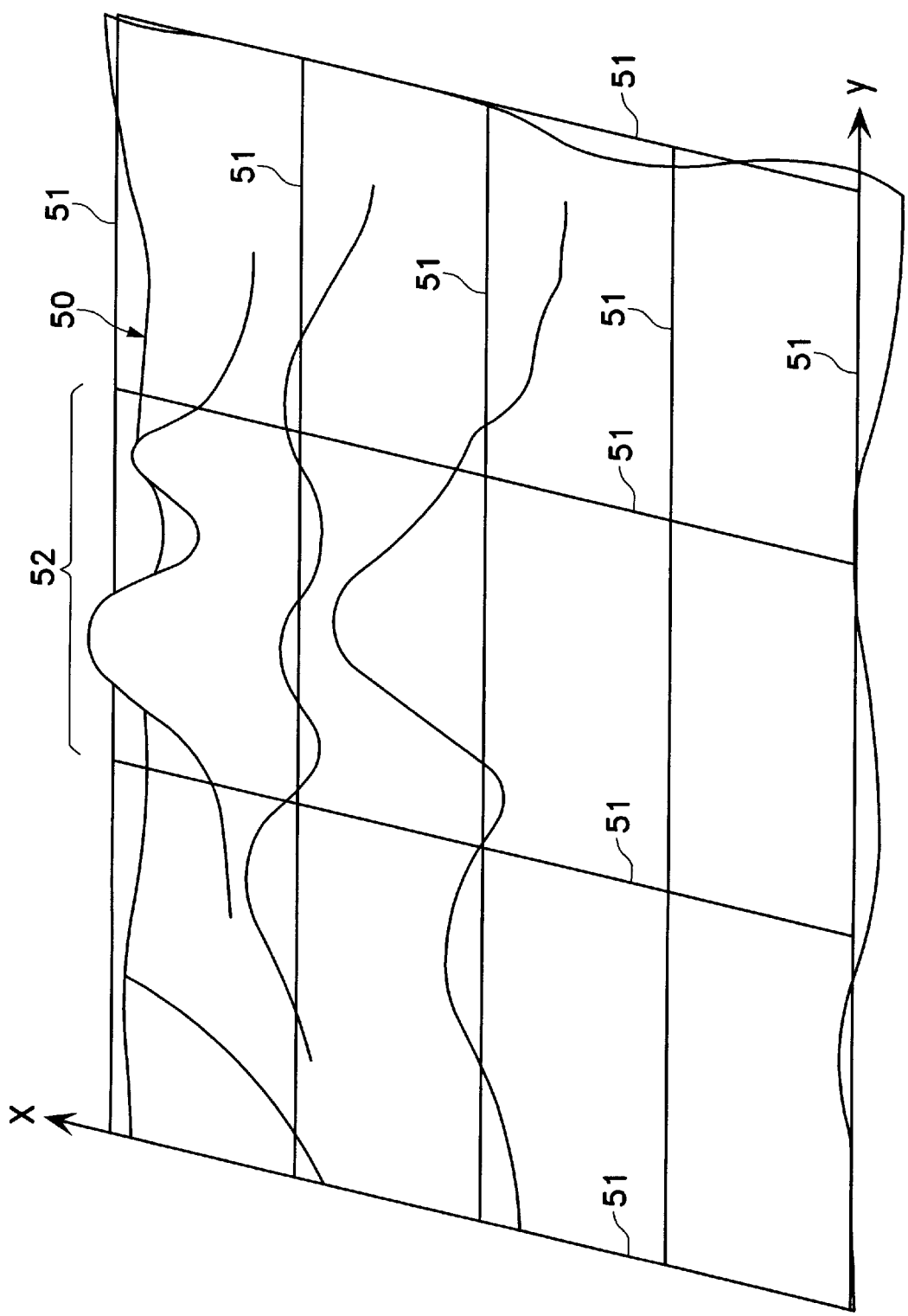
FIG. 6 shows a specific example of a terrain processed by the geographic information system.

As an example, the topography 50 shown in FIG. 6 is processed using the geographic information system 10. The satellite 19 measures the height of the observation point specified by the latitude and longitude of the observation point. The measurement data obtained by the measurement is sequentially transmitted to the discrete topography data generator 11 from the satellite 19 every time the observation point is changed as the longitude and latitude change. The discrete topography data generator 11 generates discrete topography data including the height information that represents bumps and hollows on the ground surface for each observation point based on the measurement data.

The boundary line setting circuit 21 of the pre-processor 12 draws boundary lines on the ground surface of the topography 50 based on the instruction input from the user interface 18. In this case, the grid lines 51 drawn on the xy-plane at the altitude zero that covers the entire topography 50 is projected onto the ground surface. The boundary line setting circuit 21 obtains discrete topography data for each of the regions enclosed by the boundary grid lines 51.

Figure 7:
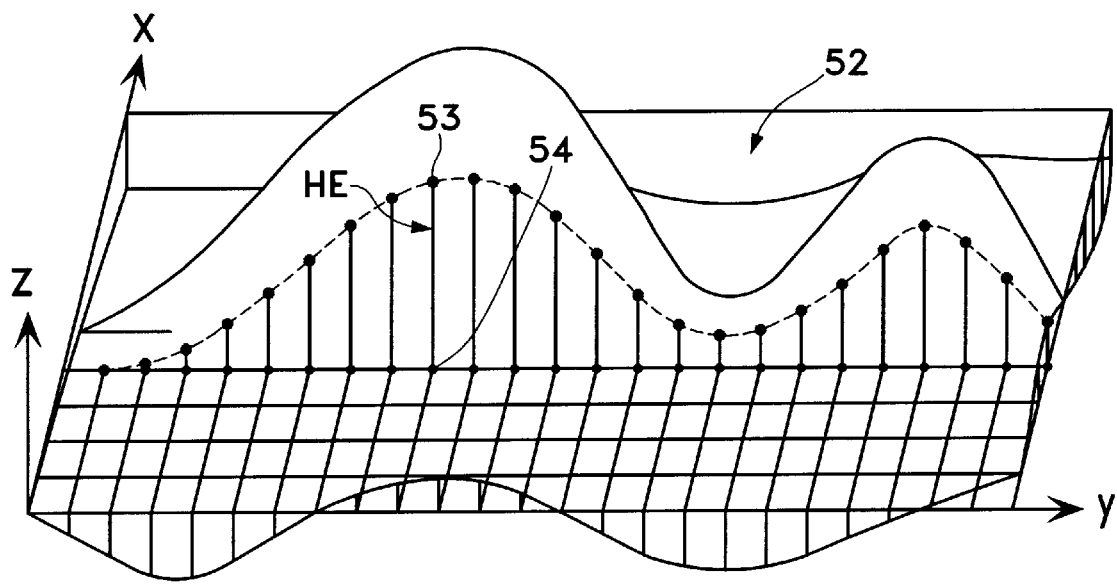
FIG. 7 shows discrete topography data that represents a region clipped out of the topography.

For example, according to the discrete topography data obtained from one region 52, the uneven shape of the ground surface is schematically drawn based on the discrete set of 3-dimensional coordinate points 53, as shown in FIG. 7. Each of the 3-dimensional coordinate points 53 is specified by the position of the observation point 54 specified by the longitude and latitude contained in the discrete topography data and the height information contained in the discrete topography data associated with the observation point 54, that is, the height HE (length in the z-axis direction) from the observation point 54 to the ground surface.

Figure 8:
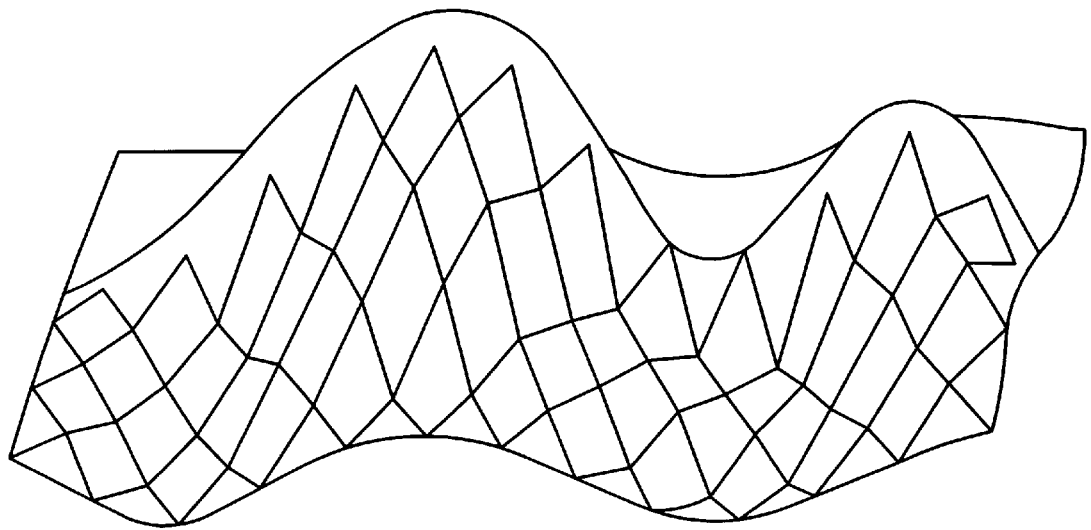
FIG. 8 shows polygonal data that represents the ground surface of the region clipped out of the topography.

Next, the uneven surface setting circuit 22 generates polygonal data which prescribes an uneven surface 56 on the region 52 based on the specified 3-dimensional coordinate point 53 as shown in FIG. 8. The polygonal data can be generated based on the conventional method. The form of representation of the polygonal data may be any of the triangle network representation, regular grid representation, and mesh representation. However, as will be explained later, the accuracy of the polygonal data does not necessarily determine the accuracy of the representation when the bumpy shape of the ground surface is represented according to the present invention.

Figure 9:
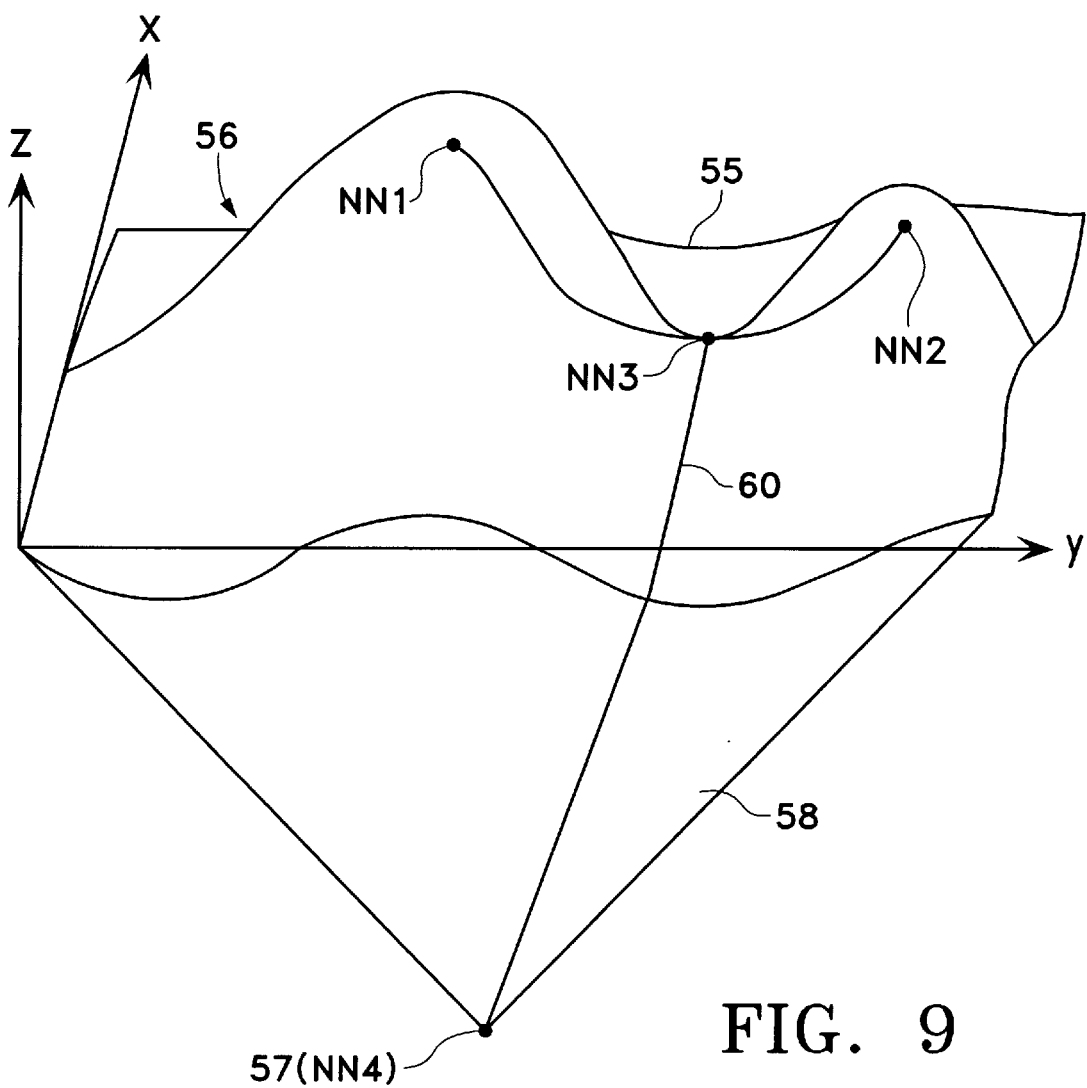
FIG. 9 shows a closed manifold constituted of an uneven surface and a virtual surface.

The closed surface generator 23, for example as shown in FIG. 9, adds to the polygonal data 3-dimensional coordinate data that specifies one 3-dimensional coordinate point 57 that is separated from the uneven surface 56 enclosed by the contour line 55. The 3-dimensional coordinate point 57 suffices to be a point separated from the center of the xy-plane by an arbitrary distance. However in this case, the straight line that extends from the 3-dimensional coordinate point 57 to the contour line 55 never intersects the uneven surface 56. Using such 3-dimensional coordinate data, a virtual surface 58 that converges from the contour line 55 to the 3-dimensional coordinate point 57 can be formed. The combination of the uneven surface 56 and the virtual surface 58 forms a closed manifold in the xyz-space.

Through the above-described sequence of processes, based on the ground surface data associated with the region 52 enclosed by the boundary line 55, manifold data that represents the shape of the manifold that contains the bumps and hollows on the ground surface of the region 52 is generated. The manifold data suffices to be represented by polygonal data. By piecing together the shapes of the ground surface represented in this way by the manifold data generated for each of the regions, the shape of the entire ground surface of the topography 50 is formed.

As shown in FIG. 9, in the modeling unit 13, which receives manifold data for each region, the structural graph generator 25 generates a Reeb graph 60 of the manifold. In generating the Reeb graph 60, the Morse function prescribing unit 30 prescribes a height function in accordance with the Morse theory in the direction of the z-axis of the xyz-space. Once the height function is set, the critical point detection unit 31 detects four critical points NN1 through NN4. The xyz-coordinate and type of each of the four critical points NN1 through NN4 are specified as a result of the detection. The specified xyz-coordinates and types are registered in accordance with the data structure shown in FIG. 3. Here, the critical points NN1 and NN2 are classified in the index "2", the critical point NN3 is classified in the index "1", and the critical point NN4 is classified in the index "0".

In detecting the four critical points NN1 through NN4 in the critical point detection unit 31, if the uneven surface 56 is represented by a smooth surface, the coordinate and index of the critical point can be easily determined by searching for the uneven surface 56 in the direction of its height. On the other hand, in the case the uneven surface 56 is represented by polygonal data as in the present embodiment, the coordinate and index of the critical point can be specified by searching for edges that converge to one vertex of the polygon.

Figure 10:
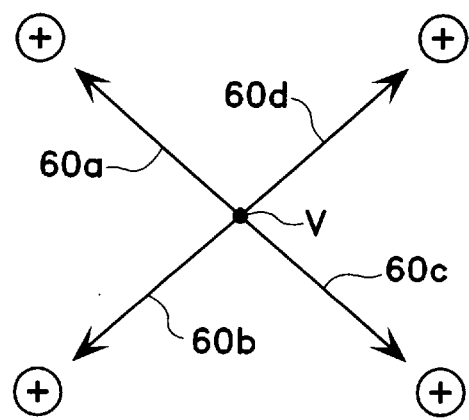
FIG. 10 shows the principle for extracting a critical point of index 0 from the polygonal data.
Figure 11:
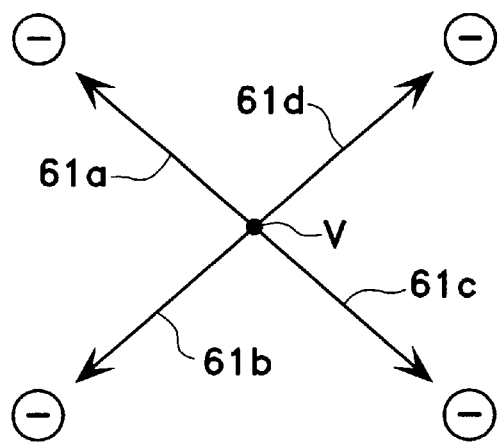
FIG. 11 shows the principle for extracting a critical point of index 2 from the polygonal data.
Figure 12:
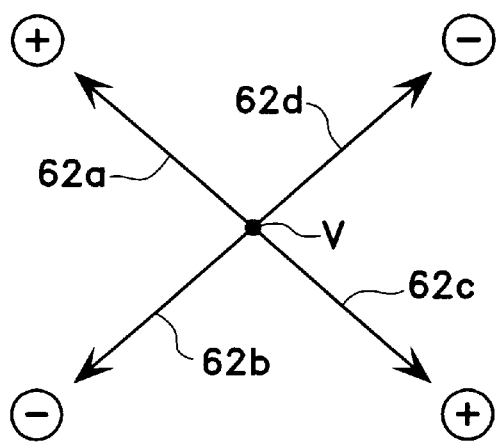
FIG. 12 shows the principle for extracting a critical point of index 1 from the polygonal data.
Figure 13:
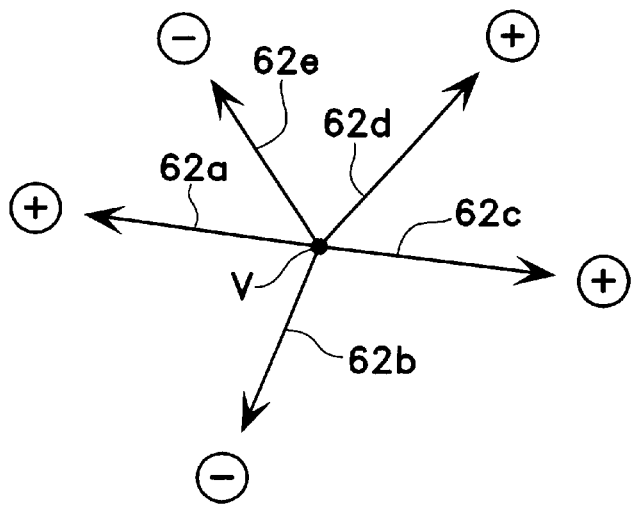
FIG. 13 shows the principle for extracting a critical point of index 1 from the polygonal data.

For example as shown in FIG. 10, if all the edges 60a through 60d connected to the vertex V of the polygon ascend from the vertex V (denoted by "+"), it can be determined that the vertex V is a pit point (index 0). On the other hand, as shown in FIG. 11, if all the edges 61a through 61d connected to the vertex V of the polygon descend from the vertex V (denoted by "−"), it can be determined that the vertex V is a peak point (index 2). For example, as shown in FIG. 12, if the edges 62a through 62d connected to the vertex V of the polygon alternately descend and ascend from the vertex V, it can be determined that the vertex V is a saddle point (index 1). For example as shown in FIG. 13, if the edges 62a through 62e connected to the vertex V of the polygon alternately descend and ascend by the unit of group of edges from the vertex V (edge 62c and edge 62d form a group of "+" edges), it can be determined that the vertex V is a saddle point (index 1).

Once the xyz-coordinate and type of each of the critical points NN1 through NN4 are specified, the critical point connection information acquiring unit 32 detects the connection relation between the critical points NN1 through NN4. This is accomplished by tracing the edges of the polygon sequentially. For example, a vertex of index 2 is connected only to a saddle point of index 1 or a pit point of index 0. Therefore, the critical point NN1 is connected to the critical point NN3, which is a point that is reached first from the critical point NN1. Similarly, the critical point NN2 is connected to the critical point NN3. A saddle point of index 1 connected to two peak points must be connected to a saddle point of index 1 or pit point of index 0 that is reached first. Hence, the critical point NN3 is connected to the critical point NN4. In this way, the connection relation between the critical point NN1 through NN4 is specified by the edges represented by a series of edges of the polygon. Each of the edges may be represented by a parametric curve that approximates the shape of the edge. The specified connection relation is registered in accordance with the data structure shown in FIG. 4. In this way, the Reeb graph of the manifold is specified.

Figure 14A:
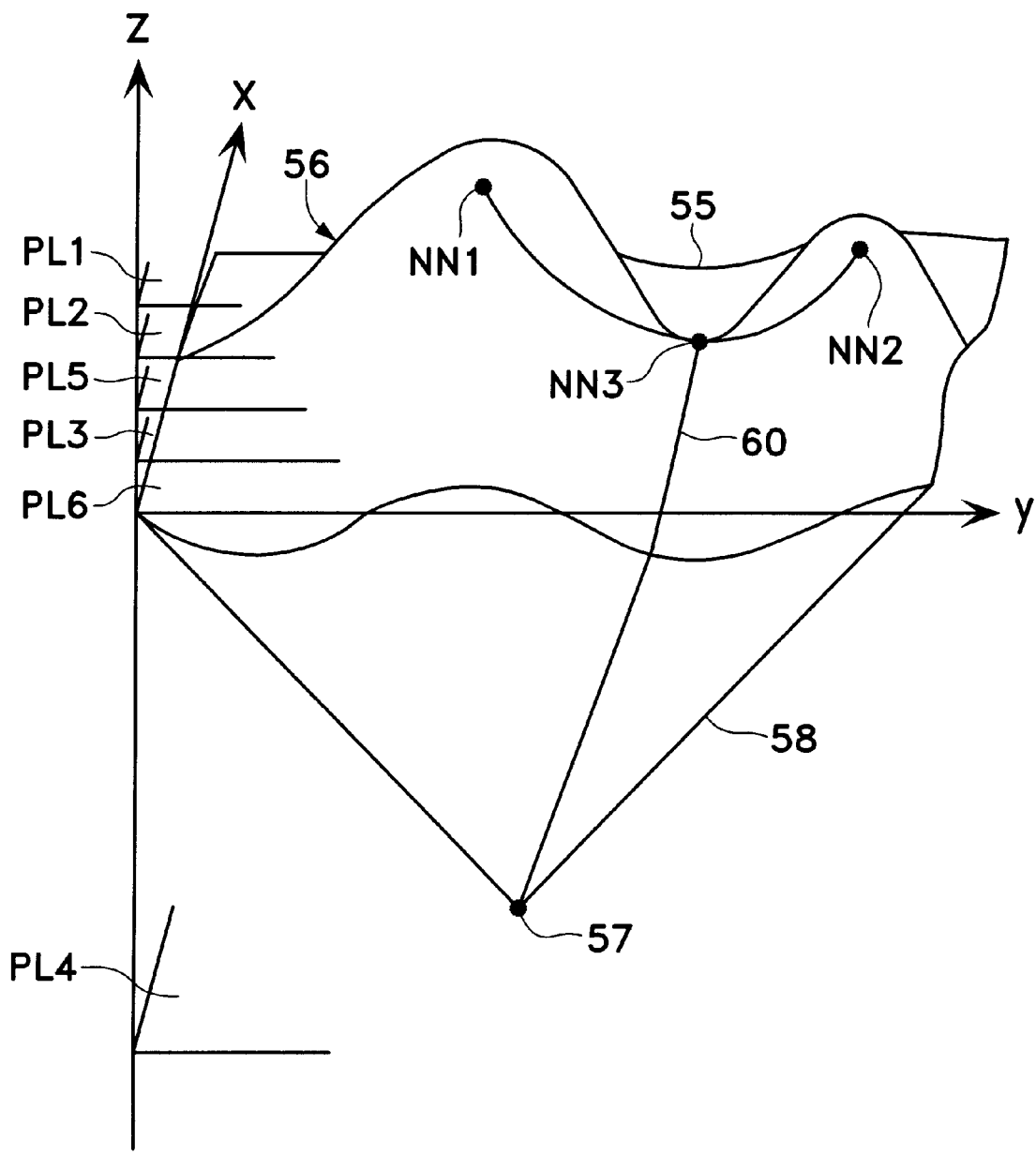
FIGS. 14a and FIG. 14b show the contour lines of the manifold.
Figure 14B:
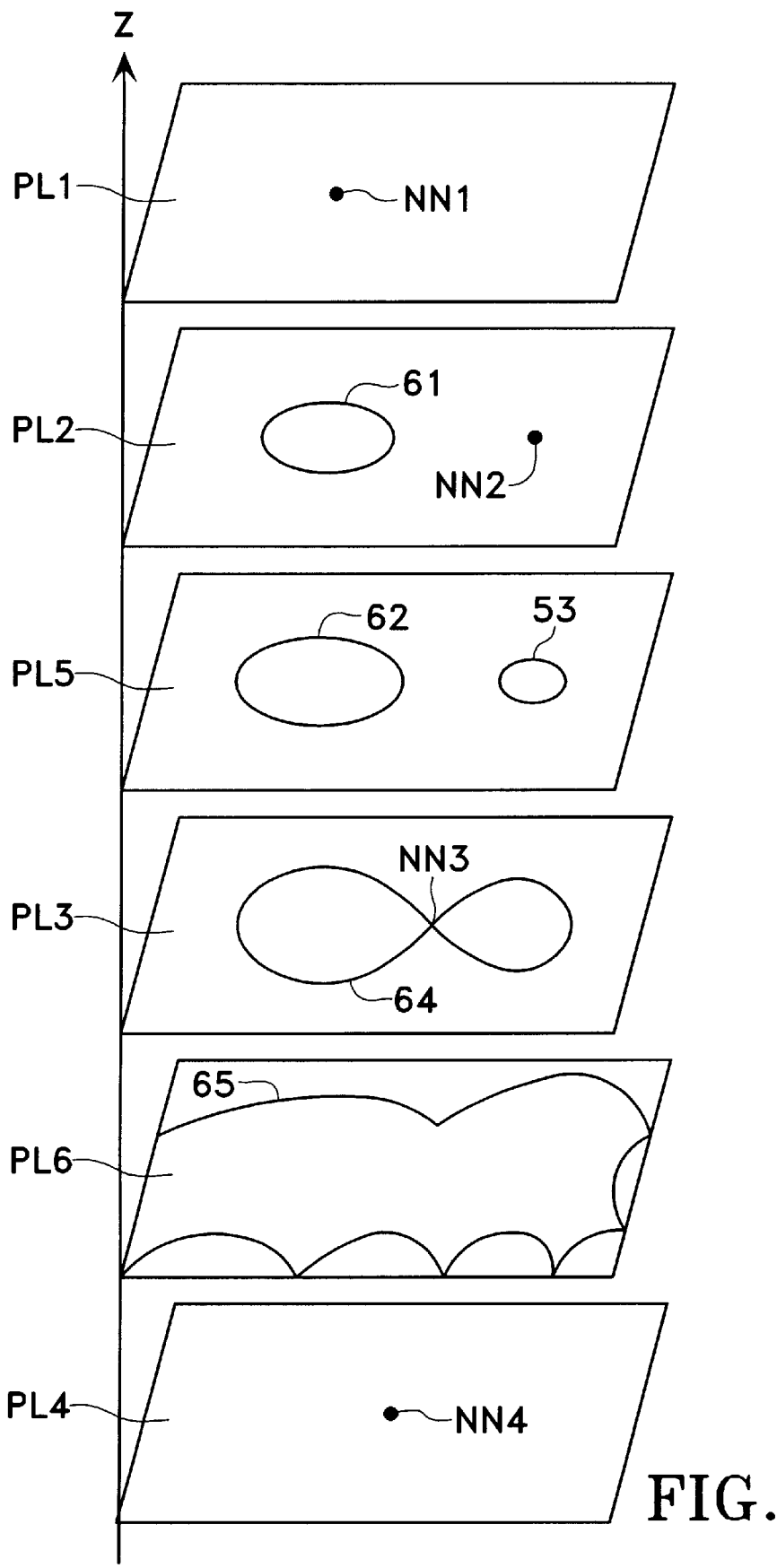

Next, for example as shown in FIG. 14a and FIG. 14b, the cross section generator 26 slices the manifold through planes orthogonal to the z-axis. In this case, planes PL1 through PL4 are prescribed at the heights of the critical points NN1 through NN4, respectively. However, in order to improve the shape accuracy of the topological geometric data, planes PL5 and P16 orthogonal to the z-axis may be additionally prescribed at intermediate positions between the planes PL1 through PL4. As a result of this slicing process, contour lines 61 through 65 are obtained from the cross sections of the manifold. These contour lines form polygons since they are obtained based on the polygonal data.

The contour smoothing circuit 28 applies free form curves to the contour lines 61 through 65 of the cross sections obtained as polygons. To do so, for example, using the vertices of the contour lines 61 through 65 as control points, spline curves such as NURBS curves or Besier curves are used. By this process, the polygonal shape represented by the polygonal data is smoothed. By smoothing the contour lines 61 through 65 using free form curves in this way, these smoothed contour curves approximate with a higher degree of accuracy the actual shape of the ground surface than the polygonal contour lines drawn based on the polygonal data.

The contour information acquiring circuit 27 geometrically specifies the smoothed contour curves 61 through 65 based on the equations of the free form curves that specify the shapes of the smoothed contour curves 61 through 65 and the z-axis coordinates of the planes on which the smoothed contour curves 61 through 65 are drawn, and detects the correspondence relation between the smoothed contour curves 61 through 65. For example, the plane PL3 containing the critical point NN3 is specified by the z-coordinate of the critical point NN3. The planes PL5 and PL6 set between the critical point NN1 through NN4 are specified by a combination of the z-coordinates of the critical point NN1 through NN4 and the equations of the edges. The correspondence relation between the contour curves 61 through 65 is detected by examining to what positions of the other contour curves one coordinate point contained in one contour curve corresponds. Thus, the positions and types of the critical point NN1 through NN4, the equations of the edges, the z-coordinates of the critical points NN1 through NN4, the equations of the contour curves 61 through 65, and the correspondence relation between the contour curves 61 through 65 constitute the topological geometric data.

According to such topological geometric data, in comparison with the case the shape of the ground surface is represented based on polygonal data, the shape of the ground surface can be represented using a smaller data amount. As a result, the data amount of geographical information stored in the storage device 17 or the like is reduced. The data amount of such geographical information is small enough to be transmitted through a network.

Next, the topography 50 represented by the topological geometric data is displayed on the display screen of the display unit 16. In the case the entire topography 50 is displayed, the topological geometric data associated with all the manifolds that contain the topography 50 is supplied to the rendering unit 14. In the case the ground surface requested to be displayed is restricted to one region 52, the topological geometric data associated with the manifold that contains the region 52 is supplied to the rendering unit 14. The range of the topography 50 to be displayed is specified through the user interface 18.

Figure 15:
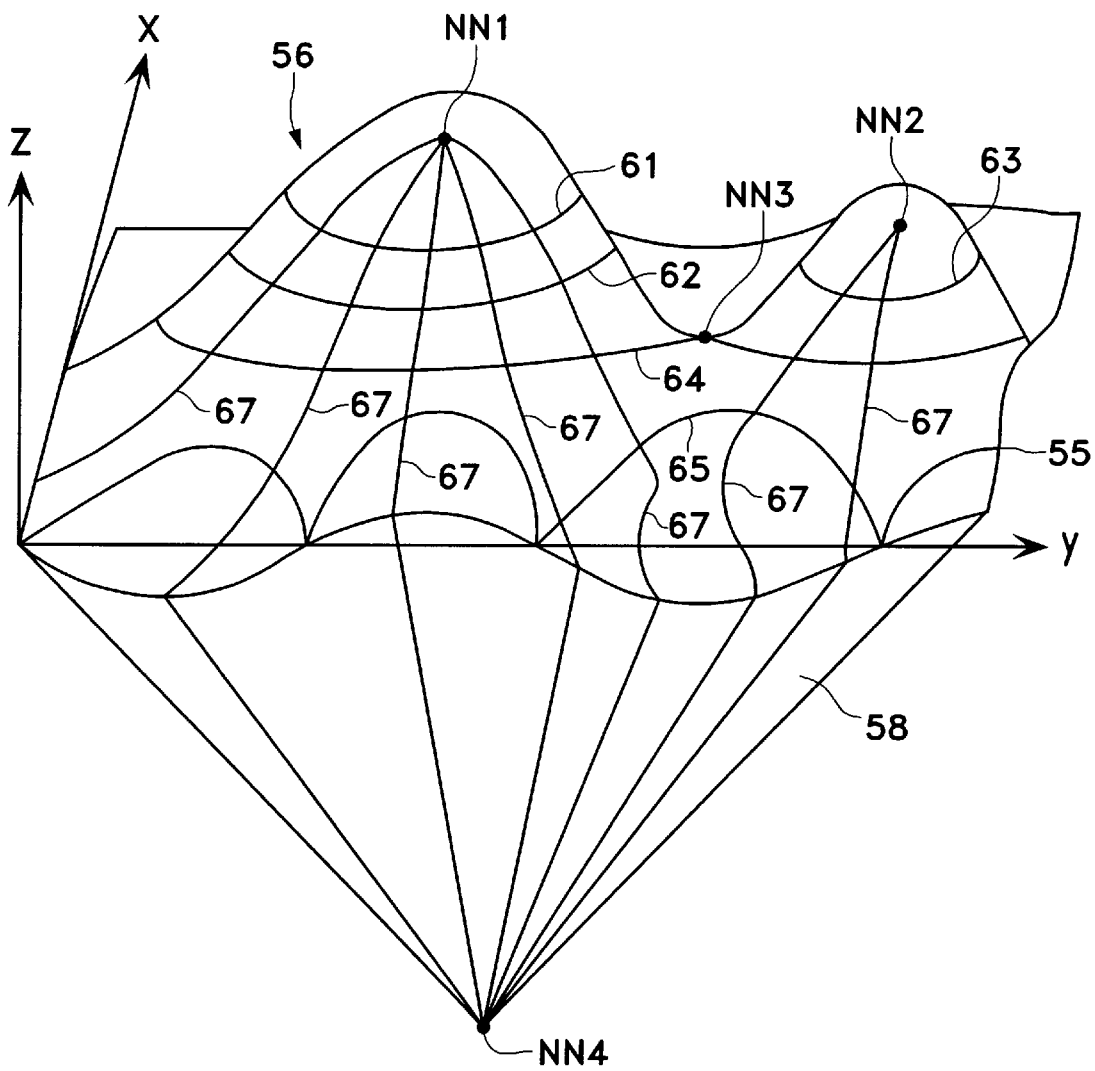
FIG. 15 shows guiding curves drawn on the manifold.

Once the rendering unit 14 receives the topological geometric data, for example as shown in FIG. 15, the guiding curve generator 33 generates guiding curves 67 for each manifold. In this case, the correspondence relation between the contour curves 61 through 65 contained in the topological geometric data is referred to. The surface patch generator 34 attaches a surface patch to each of the surface regions partitioned on the surface of the manifold by the guiding curves 67 and the contour curves 61 through 65. Thus, the surface shape of the manifold is represented by a continuous surface.

Next, the display region setting circuit 35 removes the virtual surface 58 from the 3-dimensional shape of the manifold. In this case, the display region setting circuit 35 detects the boundary curve 55 from the set of surface patches. For example, by tracing the guiding curves 67 from the 3-dimesnional coordinate point 57 which forms the pit point NN4, the boundary line between the virtual surface 58 and the uneven surface 56 is detected when the guiding curve 67 points to the interior of the manifold. This process is repeated for all the remaining guiding curves 67. The newly detected boundary is then sequentially connected to the boundary already formed. The line drawn by the union of all the detected boundaries in this way corresponds to the boundary line 55.

The display region setting circuit 35, when it is judged that multiple manifolds need to be pieced together to display the topography 50, pieces together the boundary lines 55 confirming the position relation between the manifolds. As a result, the ground surface that extends over the multiple manifolds is represented by a single uneven surface. On the other hand, when it is judged that the topography of a portion of one region is requested to be displayed, the display region setting circuit 35 clips out the portion of the region.

The visualization circuit 36 applies a shading process or hidden surface removal process to the uneven surface represented by the surface patches. The 2-dimensional display data obtained by the shading process or hidden surface removal process is then sent to the display control circuit 15. The display control circuit 15 displays the desired topography 50 on the display screen of the display unit 16 based on the received 2-dimensional display data.

Figure 16A:
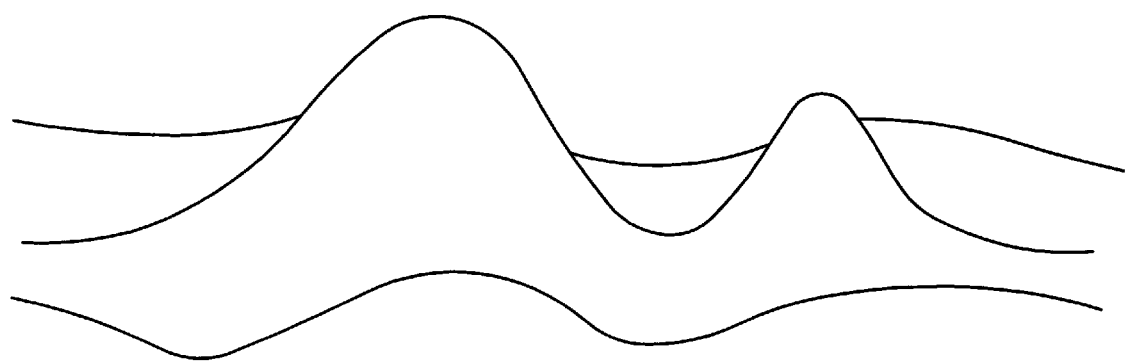
FIGS. 16a and FIG. 16b show another specific example of a boundary line along which one region is clipped out.
Figure 16B:
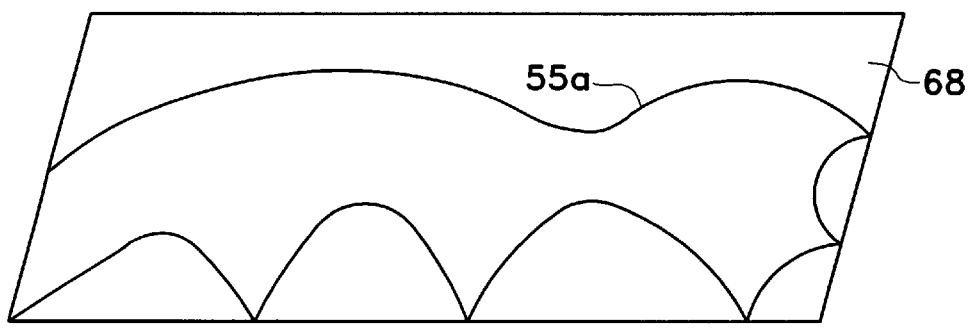

The boundary curve 55a of a region may be drawn along an iso-height contour line on the ground surface, as shown in FIG. 16a and FIG. 16b. Since such a boundary curve 55a is drawn on a plane 68 perpendicular to the z-axis, the boundary curve 55a coincides with, for example, the contour line 65 of the above-mentioned manifold. Therefore, in removing the virtual surface from the manifold, the boundary curve 55a can be easily detected.

Figure 17:
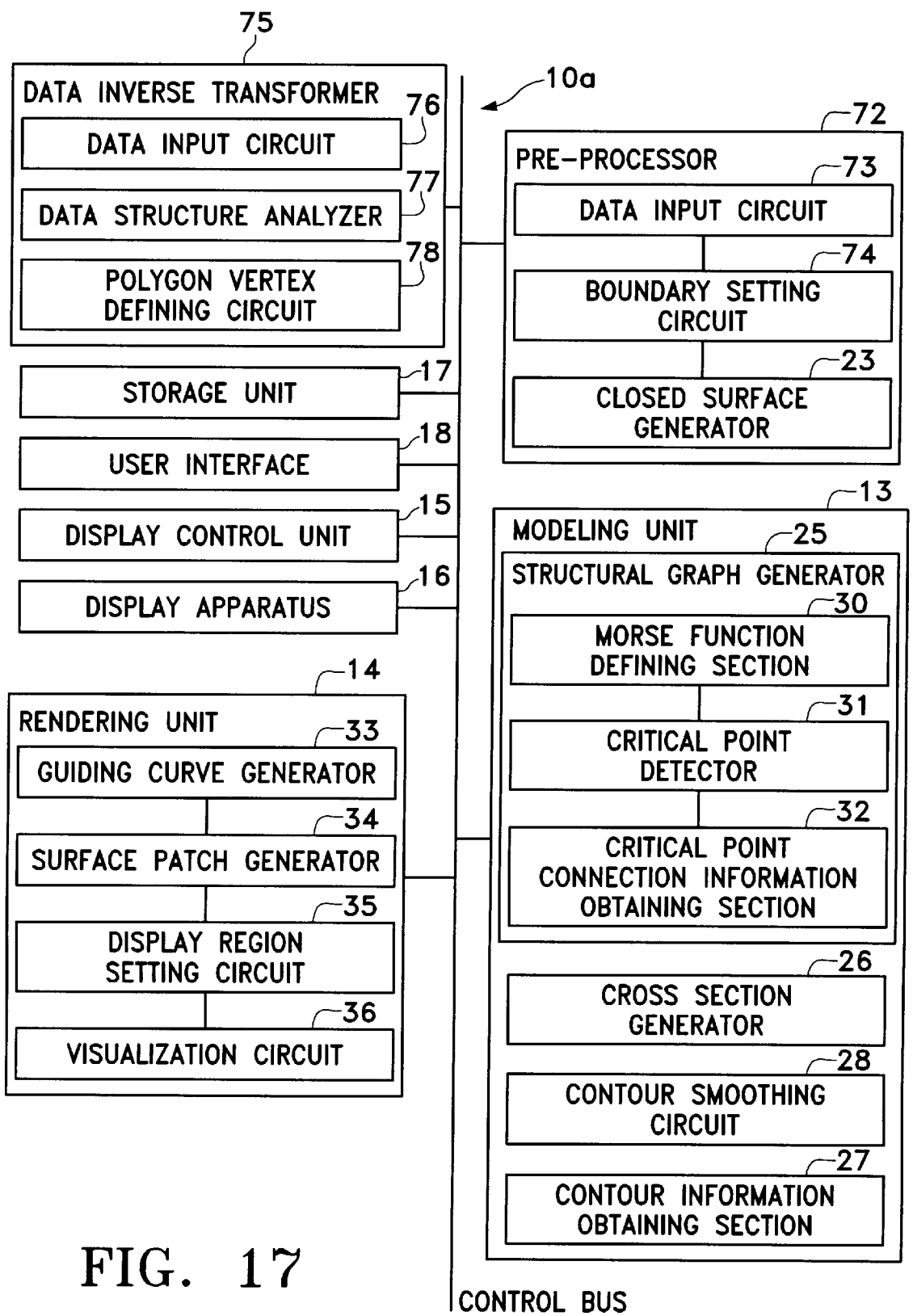
FIG. 17 shows another exemplary topography information system that uses the novel topography information data.

FIG. 17 shows another exemplary geographic information system that uses the novel topography information data representation according to the present invention. In this geographic information system 10a, topological geometric data is generated based on conventional topography information data constituted of, for example, polygonal data without using the above-mentioned discrete geographic data. Here, the configuration of the pre-processor 72 of the geographic information system 10a differs from the configuration of the pre-processor 12 of the geographic information system 10. This pre-processor 72 will now be explained in detail. The modeling unit 13 and rendering unit 14 shown in FIG. 17 have the same function and play the same role as the modeling unit 13 and rendering unit 14 shown in FIG. 1, respectively. Hence, these units will not be explained here.

The pre-processor 72 of the geographic information system 10a has a data input circuit 73 which acquires polygonal data as ground surface data that represents the bumpy shape of the ground surface from the network or the storage device 17. The boundary line setting circuit 74 traces the edges of the polygon specified by the polygonal data to draw a boundary line and clips out the region enclosed by the boundary line along the boundary line. By this clip-out process, the piece of ground surface clipped out along the boundary line is represented by a series of polygonal data. As explained before, the closed surface generator 23 generates a closed manifold that encloses the bumpy surface enclosed by the boundary line represented by the polygonal data. The generated closed manifold is sent to the modeling unit 13. The modeling unit 13 then generates topological geometric data obtained by adding geometric information to the topological information.

As shown in FIG. 17, the geographic information system 10a may have a data inverse transformer 75 which inverse-transforms the topological geometric data obtained in the modeling unit 13 to polygonal data. By using such a data inverse transformer 75, for example, the ground surface represented by the topological geometric data can be displayed on the display screen of the display unit 16 using the conventional polygonal data rendering unit without using a rendering unit 14 specifically designed to render topological geometric data.

To be more specific, the data inverse transformer 75 has a data input circuit 76 which acquires, for example, the above-mentioned topological geometric data from the storage device 17. The data structure analysis circuit 77 analyzes the structure of the acquired topological geometric data and extracts elements that constitute the surface of the manifold. Such elements include, for example, the contour lines and guiding curves of the manifold. In acquiring the guiding curves, the guiding curve generator 33 installed in the rendering unit 14 is used. The polygon vertex defining circuit 78 specifies the vertices of the polygon on the surface patches that are generated based on the extracted elements.

Figure 18:
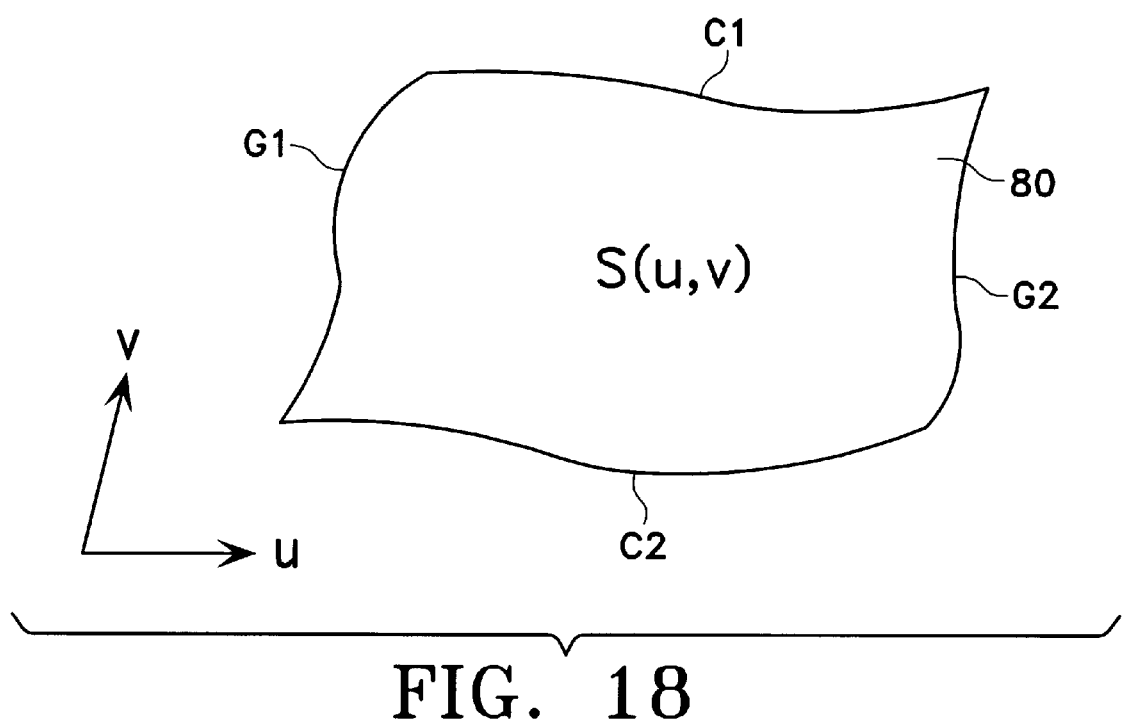
FIG. 18 shows a parametric patch.

Next, the operation of the polygon vertex defining circuit 78 will be explained in detail. The polygon vertex defining circuit 78, for example as shown in FIG. 18, attaches a parametric patch S(u, v) to the quadrilateral 80 enclosed by two contour lines C1 and C2 and two guiding curves G1 and G2. Here, u and v are parameters which lie in the range $0 \leq u \leq 1$, and $0 \leq v \leq 1$. For the parametric patch S(u, v), for example, a tensor product surface or Coons surface or Gregory surface can be used. Any triangular region that appears in the neighborhood of a critical point is treated as a degenerate quadrilateral by the conventional method. Hence, such a parametric patch S(u, v) is attached in the same manner to the triangular region.

Figure 19:
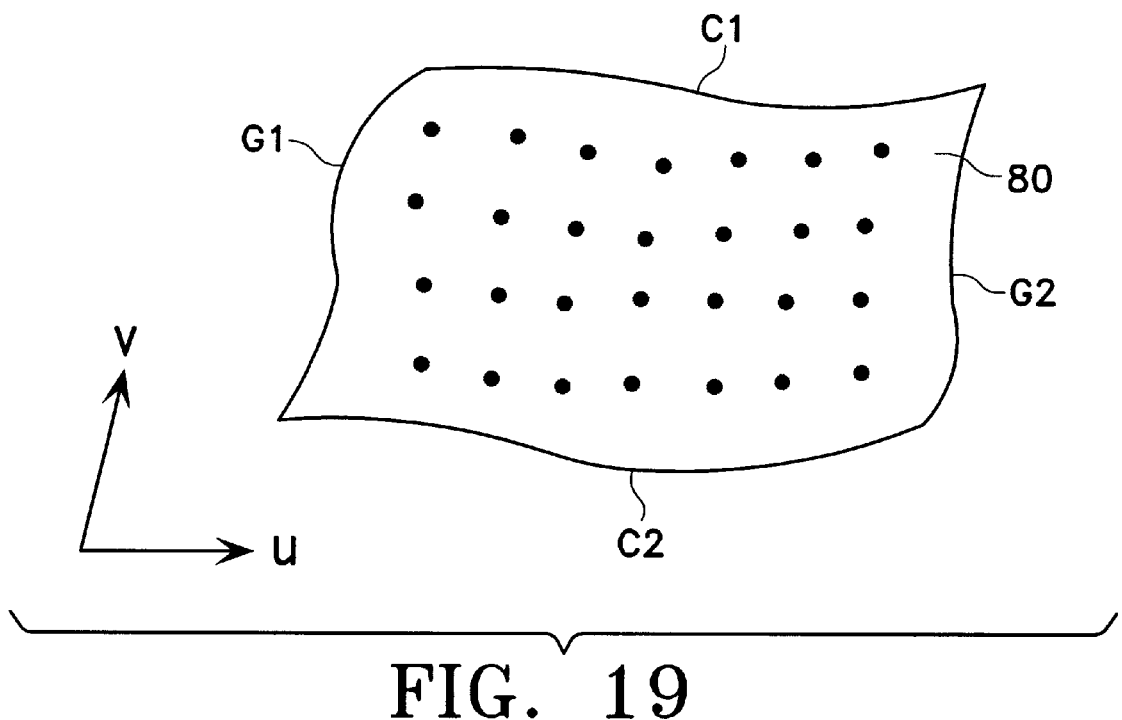
FIG. 19 shows vertices of the polygon acquired from the parametric patch.

The polygon vertex defining circuit 78 plots the position of the parametric patch S(u, v) by gradually changing the values of the parameters u and v as shown in FIG. 19. In this case, the accuracy of the polygonal data can be improved by changing the values of the parameters u and v by small amounts. The points plotted in this manner are defined as the vertices of the polygon. The relation between neighboring three points is specified to obtain polygonal data.

The topography information data processing method of the present invention may be achieved not only by the above-described hardware configuration but also by a software process. In such a case, for each of the circuit configurations such as the above-described pre-processors 12, 72, modeling unit 13, rendering unit 14, data inverse transformer 75 and the like, a software module for operating each of the circuit configurations is created. These software modules are stored, for example, in the storage unit 17. In this case, the storage unit 17 includes recording mediums such as a portable CD (compact disk) and a FD (floppy disk).

Moreover, the topography information data processing method of the present invention can be used for processing not only discrete topography data but also observation data obtained discretely in a 3-dimensional space such as sea temperatures and ocean currents.

What is claimed is:

1. A topography information data processing method comprising:
   acquiring ground surface data which represents a shape of an uneven ground surface;
   generating manifold data which represents a shape of a manifold that encloses said uneven ground surface based on said ground surface data; and
   acquiring topological geometric data from said manifold data.

2. A method defined in claim 1, wherein, in acquiring said topological geometric data, the Morse theory is applied to said manifold data.

3. A method defined in claim 1, wherein, in acquiring said ground surface data, a region is cut out along a boundary line drawn on said ground.

4. A method defined in claim 3, wherein said boundary line is drawn on said ground by projecting grid lines drawn on an arbitrary plane.

5. A method defined in claim 3, wherein said boundary line is drawn on said ground as an iso-height contour on said ground.

6. A method defined in claims 3, wherein in generating said manifold data, an arbitrary virtual surface is attached to an uneven surface defined by said boundary line to form a closed manifold.

7. A method defined in claim 6, wherein said virtual surface is formed by adding one three-dimensional coordinate point data to said ground surface data.

8. A method defined in claim 6, further comprising:
   removing said virtual surface; and
   generating display data of said ground based on said uneven surface.

9. A method defined in claim 8, wherein, in removing said virtual surface, said boundary line is detected.

10. A topography information data processing method comprising:
    acquiring discrete topography data having height or depth of an uneven ground surface;
    generating manifold data which represents a shape of a manifold that encloses said uneven ground surface based on said discrete topography data; and
    acquiring topological geometric data from said manifold data.

11. A method defined in claim 10, wherein, in acquiring said topological geometric data, the Morse theory is applied to said manifold data.

12. A method defined in claim 10, wherein, in acquiring said discrete topography data, a region is cut out along a boundary line drawn on said ground.

13. A method defined in claim 12, wherein said boundary line is drawn on said ground by projecting grid lines drawn on an arbitrary plane.

14. A method defined in claim 12, wherein said boundary line is drawn on said ground as an iso-height contour on said ground.

15. A method defined in claim 12, wherein, in generating said manifold data, an arbitrary virtual surface is attached to an uneven surface defined by said boundary line to form a closed manifold.

16. A method defined in claim 15, wherein said virtual surface is formed by adding one three-dimensional coordinate point data to said ground surface data.

17. A method defined in claim 15, further comprising:
    removing said virtual surface; and
    generating display data of said ground based on said uneven surface.

18. A method defined in claim 17, wherein, in removing said virtual surface, said boundary line is detected.

19. A topography information data processing apparatus comprising:
    a data inputting device to acquire ground surface data which represents a shape of an uneven ground surface;
    a preprocessor to generate manifold data which represents a shape of a manifold that encloses said uneven ground surface based on said ground surface data; and
    a modeling unit to obtain topological geometric data from said manifold data.

20. An apparatus defined in claim 19, wherein the data inputting device inputs discrete topography data having height or depth of the uneven ground surface.

21. An apparatus defined in claim 19, further comprising a rendering processor to generate display data of said ground based on said uneven surface.

* * * * *